June 23, 1970   R. L. LANDREE ET AL   3,516,540

FILTER WITH AUTOMATIC SHUTOFF

Filed Nov. 12, 1968

INVENTORS
RAYMOND L. LANDREE
RAY J. RAUPP

BY William F. Thornton

ATTORNEY

United States Patent Office 3,516,540
Patented June 23, 1970

3,516,540
FILTER WITH AUTOMATIC SHUTOFF
Raymond L. Landree, Madison Heights, and Ray J. Raupp, Bloomfield Hills, Mich., assignors to The Bendix Corporation, a corporation of Delaware
Filed Nov. 12, 1968, Ser. No. 774,722
Int. Cl. B01d 27/10
U.S. Cl. 210—137     5 Claims

ABSTRACT OF THE DISCLOSURE

A filter assembly comprising a tubular filter element adapted to filter fluid flowing substantially radially therethrough, a coil spring disposed within and in a radial supporting relationship with the filter element, and a piston engaged with one end of the spring so that in response to higher fluid pressures in the system, the piston is moved in a direction to compress the spring and move the spring coils into engagement so as to shut off flow of fluid through the filter element.

---

The principal object of this invention is to provide an automatic shutoff device for filter systems which is operable when subjected to high differential pressure to regulate the flow through the filter element.

In some filter systems, the filter element is subjected to higher pressures at certain times, such as during cold start situations in a fuel filtering system, thereby necessitating the construction of filter elements which will withstand high differential pressures. Such a construction, or the provision of a special bypass arrangement, increases the cost of the filter system. It is an object of this invention, therefore, to provide a filter assembly in which the flow of fluid through the filter is automatically shut off in response to such a high differential pressure condition. In other systems, a complete shutoff is not necessary or desirable. In such cases, the filter assembly of this invention can provide a restriction or regulation of the flow of fluid through the filter element.

In the filter assembly of this invention, a coil spring is disposed concentrically within and in close proximity to the radially inner wall of the filter element. One end of the coil spring is engaged with a stop, and the other end is positioned in engagement with a piston positioned so that as the differential pressure across the filter increases, the piston is moved in a direction to compress the spring and thereby reduce the space between the spring coils. When the pressure differential is sufficiently high, the piston will completely compress the spring so as to shut off the flow through the filter element. This enables the use of a less expensive low pressure collapse filter element which has heretofore not been usable under these conditions. If restricted flow through the filter element is desired under these conditions, orifices or notches are incorporated in the spring allowing a regulated flow at the selected maximum differential pressure across the filter element.

Further objects, features and advantages of this invention will become apparent from a consideration of the following description, the appended claims, and the accompanying drawing in which:

Figure 1:
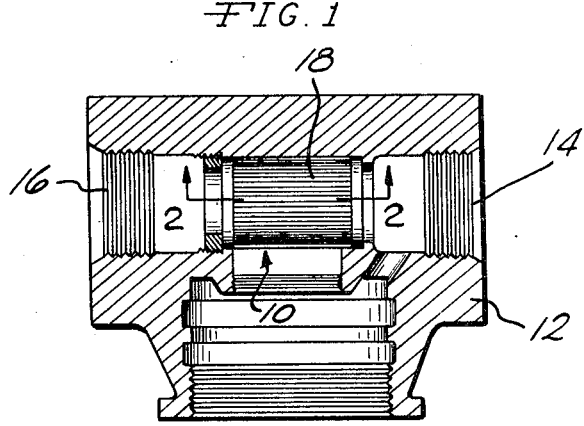
FIG. 1 is a sectional view of a portion of a fluid filtering system having the filter assembly of this invention incorporated therein.
Figure 2:
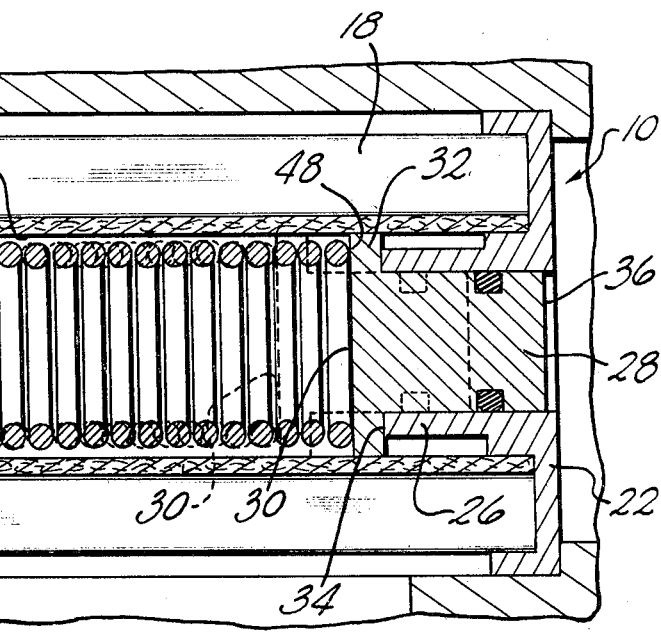
FIG. 2 is a longitudinal sectional view of the filter assembly of this invention, as seen from substantially the line 2—2 in FIG. 1, showing the piston in the assembly in its extreme positions in solid and broken lines.

With reference to the drawing, the filter assembly of this invention, indicated generally at 10, is shown in FIG. 1 in a portion of a fluid filtering system, such as a fuel supply system for an engine, in which fluid to be filtered flows into a body 12 through an inlet 14, thence through the filter assembly 10 and out through an outlet 16 for filtered fluid. As shown in FIG. 2, the filter assembly 10 of this invention includes a generally tubular filter element 18 which can be formed of a low pressure collapse material, such as paper or a plastic impregnated paper, and a pair of end caps 20 and 22 which function as a retainer for the element 18. The end cap 20 has an axially inwardly directed tubular flange 24 and the end cap 22 is illustrated as being provided with an axially inwardly directed tubular guide 26. A piston 28 is slidably supported in the guide 26 in a fluid tight relation therewith and terminates at its inner end 30 in a flange 32 engageable with the inner end 34 of the guide 26. The opposite end 36 of the piston 28 faces in a direction axially outwardly of the filter element 18.

An elongated coil spring 40 is positioned concentrically within the filter element 18 in close proximity to the inner wall 42 of the filter element 18. The coil spring 40 has a plurality of coils 44 which are spaced apart in a direction axially of the spring 40 when the piston 28 is in its extended position shown in solid lines in FIG. 2. One end 46 of the coil spring 40 is positioned in engagement with the inner end of the end cap flange 24, which thus functions as a stop to retain the coil spring 40 within the filter element 18. The opposite end 48 of the coil spring 40 engages the end 30 of the piston 28 so as to normally urge the piston 28 to a position in which the flange 32 thereon engages the inner end 34 of the guide 26. As shown in broken lines in FIG. 2, the piston 28 is movable inwardly to compress the spring 40 to a position in which all of the coils 44 are in engagement so as to shut off flow of fluid through the filter element 18.

The filter assembly 10 is installed in the body 12 as shown in FIG. 1 so that fluid to be filtered entering the body 12 through the inlet 14 can flow radially inwardly into the filter assembly 10 through the filter element 18. The filtered fluid then travels axially of the filter element 18 through the end cap flange 24 to the body outlet 16. The piston end 36 is thus subjected to the fluid pressure at the inlet 14 and the piston end 30 is subjected to the fluid pressure at the outlet 16. Thus, the piston 28 is subjected to the same differential pressure as that existing across the filter element 18. As this differential pressure increases, the piston 28 will be moved toward its dotted line position shown in FIG. 2, and when the differential pressure reaches a predetermined maximum, the piston 28 will fully compress the spring 40 so as to shut off flow through the filter element 18, thus protecting the filter element 18 against being subjected to high differential pressures.

Figure 3:
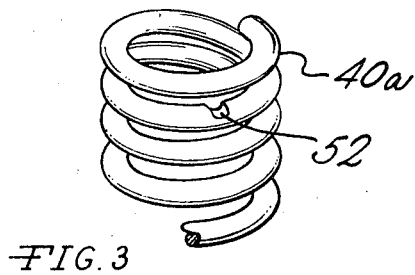
FIG. 3 is a fragmentary perspective view of a portion of a modified coil spring usable in the assembly shown in FIG. 2.

In the event limited or reduced flow of the fluid through the filter element 18 is desired, when the predetermined maximum differential pressure is reached, instead of a complete shutoff of flow, a spring, indicated at 40a in FIG. 3 is substituted in the assembly 10 for the spring 40. The spring 40a differs from the spring 40 only in that it is provided with one or more openings 52 so that when the spring is fully compressed, a restricted or reduced flow therethrough permitted through the opening 52. In the illustrated spring 40a, the opening 52 is in the form of a notch, but it is to be understood that an orifice through one or more of the spring coils would be the equivalent.

From the above description it is seen that this invention provides a filter assembly which incorporates an automatic fluid shutoff feature. This shutoff can be complete, as illustrated in FIG. 2 or it can be partial, when the spring 40a illustrated in FIG. 3 is employed. This enables the use of an inexpensive low pressure collapse filter element such as shown at 18, in systems wherein high differential pressures are encountered, when reduced flow is desired at the maximum differential pressure condition, a well known reinforcing core can be used in combination with the filter element 18.

It will be understood that the filter with automatic shutoff which is herein disclosed and described is presented for purposes of explanation and illustration and is not intended to indicate limits of the invention, the scope of which is defined by the following claims.

What is claimed is:

1. In a fluid filtering system having a generally tubular filter element adapted to filter fluid flowing radially therethrough, a coil spring disposed substantially concentrically within and in close proximity to said element, said coil spring having a plurality of spaced coils and a pair of ends, stop means engaged with one of said coil spring ends, piston means engaged with the opposite one of said coil spring ends and operable on movement toward said stop means to compress said spring and move said coils into engagement so as to block flow of fluid through said element.

2. The structure according to claim 1 further including retainer means disposed in a supporting relation with said filter element, and guide means on said retainer means extending axially within said element and disposed in a supporting relation with said piston means.

3. The structure according to claim 2 further including coacting means on said piston means and said guide means engageable to limit expansion of said coil spring in a direction away from said stop means.

4. The structure according to claim 1 wherein said system includes passage means for delivering fluid to be filtered to said element, and said piston means has a pair of ends one of which is engaged with said coil spring and the other one of which is exposed to said fluid to be filtered.

5. The structure according to claim 1 wherein at least one of said coils has an opening formed therein so that on movement of said coils into engagement a limited amount of fluid can flow through said spring by travelling through said opening.

References Cited

UNITED STATES PATENTS

| | | | |
|---|---|---|---|
| 2,879,892 | 3/1959 | Frakes | 210—90 |
| 3,207,311 | 9/1965 | Kasten | 210—137 |
| 3,422,956 | 1/1969 | Hadden | 210—130 X |
| 3,447,689 | 6/1969 | Solymar | 210—90 X |

JOHN W. ADEE, Primary Examiner

U.S. Cl. X.R.

210—143, 489